United States Patent [19]

MacKay et al.

[11] 4,128,493

[45] Dec. 5, 1978

[54] COMPOSITIONS USEFUL IN PROCESS FOR EXTRACTION OF METAL VALUES FROM ACIDIC SOLUTIONS

[75] Inventors: Kenneth D. MacKay, Circle Pines; Edgar R. Rogier, Minnetonka, both of Minn.

[73] Assignee: General Mills Chemicals, Inc., Minneapolis, Minn.

[21] Appl. No.: 822,765

[22] Filed: Aug. 8, 1977

Related U.S. Application Data

[62] Division of Ser. No. 630,600, Nov. 10, 1975, Pat. No. 4,058,585.

[51] Int. Cl.$^2$ .................................................. C09K 3/00
[52] U.S. Cl. ...................................... 252/184; 252/182; 260/307 D; 260/501.15; 260/566 A; 260/567.6 M; 260/567.6 H; 260/567.6 F; 546/134; 546/181

[58] Field of Search ............................... 252/184, 182; 260/307 D, 566 A, 567.6 R, 567.6 M, 567.6 H, 567.6 F, 286 Q, 287 XA, 501.15

[56] References Cited

U.S. PATENT DOCUMENTS

| | | | |
|---|---|---|---|
| 2,645,593 | 7/1953 | Erskine | 260/501.15 |
| 3,326,919 | 6/1967 | Wakeman et al. | 260/286 Q |
| 3,511,849 | 5/1970 | Wilson | 260/567.6 R |
| 3,794,649 | 2/1974 | Hammond et al. | 260/286 Q |
| 3,939,203 | 2/1976 | Mattison et al. | 260/566 A |
| 4,020,105 | 4/1977 | Ackerley et al. | 260/566 A |
| 4,020,106 | 4/1977 | Ackerley et al. | 260/566 A |

*Primary Examiner*—Benjamin R. Padgett
*Assistant Examiner*—Deborah L. Kyle
*Attorney, Agent, or Firm*—Patrick J. Span; Gene O. Enockson

[57] ABSTRACT

Process of extracting metals using organic solvent solutions of salts of hydrogen ion exchange agents and quaternary ammonium compounds. Organic solvent solutions of such quaternary ammonium salts of hydrogen ion exchange agents.

4 Claims, No Drawings

COMPOSITIONS USEFUL IN PROCESS FOR EXTRACTION OF METAL VALUES FROM ACIDIC SOLUTIONS

This application is a division of application Ser. No. 630,600, filed Nov. 10, 1975 now U.S. Pat. No. 4,058,585.

This invention relates to compositions useful in liquid ion exchange recovery of metals.

Liquid ion exchange recovery of metal values from their aqueous solutions has become increasingly important in the commercial production of high quality metal on a large scale. These exchange recovery systems generally involve contacting the aqueous metal containing solution with an exchange reagent dissolved in an essentially water-immiscible organic solvent whereby at least part of the metal values are transferred to the organic phase, separating the metal pregnant organic phase from the aqueous phase and then contacting the metal pregnant organic phase with an aqueous stripping solution to transfer the metal values to the stripping solution. The net effect is generally to arrive at a more concentrated metal containing solution (i.e. the metal pregnant strip solution) from the starting relatively dilute metal containing aqueous solution. The metal pregnant strip solution is of controllable composition or purity and the metal values can be directly recovered therefrom, most generally be electrolysis. The entire process is generally continuous with recycle of the stripped organic phase for contacting further quantities of metal containing aqueous solutions. Counter-current, multiple stage extractions are generally included in these continuous circuits.

Various metal values are optimally extracted at defined pH ranges using particular hydrogen ion exchange reagents. In this respect, the entire system will be designed around the use of a particular liquid ion exchange reagent optimally operable with a designated pH range for the specific metal involved. Thus the pH of the aqueous leach solution will be altered if necessary to fall within the optimum extraction range. In this respect, acid or base may be added to bring the pH into the desired range.

Despite the above initial pH adjustment, an additional problem is often encountered. Thus the acidity of the solution being extracted is progressively increased (i.e. the pH is lowered) by the exchange of metal ions in the solution for hydrogen ions on the liquid ion exchange reagent as the process proceeds. This can cause loss of efficiency as the pH of the solution being extracted drops below the optimum range for the particular hydrogen ion exchange reagent and metal being extracted. One prior procedure used in attempting to attack this problem has been the addition of alkaline reagents, such as ammonia, lime or the like, to neutralize the forming acid. This can require careful monitoring. Additionally, such neutralization increases the overall cost of the recovery process due to the cost of the neutralizing reagents which are added and also because of the loss of acid through said neutralizing.

A more recent suggested procedure is that of U.S. Pat. No. 3,676,106 to Wayne C. Hazen. In the process suggested in this patent, the acidity of the leach solution is controlled during the process by contacting same with a solvent extractant for the acid when the acidity of the leach solution has reached a point at which the recovery of metal ions is no longer efficient. The Patent discloses that long chain secondary and tertiary amines are preferred extractants for the hydrogen ions. The acid can be stripped from this amine extractant solution and the latter then reused. The water strip containing acid can then be used for further ore leaching if desired. This process thus involves an additional step for treating the leach solution as well as the step of recovering acid from the amine containing solvent extractant. If the latter were not carried out, substantial increased costs could be incurred due to loss of amine and the solvent therefor.

We have now discovered a new procedure for avoiding a decrease in aqueous pH during extraction and compositions useful in this improved process. Our process employs a solution of a salt of a hydrogen ion exchange agent and a quaternary ammonium compound in an essentially water-immiscible organic solvent. Such salts can be formed by washing the corresponding solution of the hydrogen ion exchange reagent and the quaternary ammonium compound with water or aqueous bases. Such neutralization or salt formation step can be illustrated by the following equation (when a base is used):

$$LH_{org.} + QX_{org.} + B_{aq.} \rightarrow QL_{org.} + BHX_{aq.}$$

where L is the anion of the hydrogen ion exchange agent, Q is the quaternary ammonium cation, X is the inorganic anion of the starting quaternary ammonium compound and B is the base. This can be further illustrated in respect of the use of a specific base as follows:

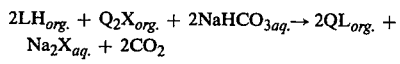
$$2LH_{org.} + Q_2X_{org.} + 2NaHCO_{3\,aq.} \rightarrow 2QL_{org.} + Na_2X_{aq.} + 2CO_2$$

This formed salt solution is then used to contact the acidic aqueous metal containing solution to extract at least part of the metal values into the organic phase. The extraction step can be illustrated by the following equation:

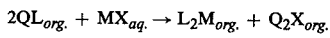
$$2QL_{org.} + MX_{aq.} \rightarrow L_2M_{org.} + Q_2X_{org.}$$

where M is a divalent cation (e.g., $Ni^{++}$, $Co^{++}$) and X is a divalent anion (e.g., $SO_4^{--}$). From this equation, it is readily apparent that there is no net transfer of hydrogen ions (protons) from the organic phase to the aqueous phase during the extraction. Accordingly, pH decrease is eliminated by our process.

The loaded organic phase can be stripped of metal values by contacting same with aqueous acidic solutions. This can be illustrated by the following equation:

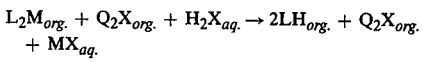
$$L_2M_{org.} + Q_2X_{org.} + H_2X_{aq.} \rightarrow 2LH_{org.} + Q_2X_{org.} + MX_{aq.}$$

The metal values are then recovered from the aqueous phase by conventional techniques, especially electrodeposition. Following the stripping stage, the organic phase can again be neutralized by washing as previously indicated to form the salt of the hydrogen ion exchange reagent and the quaternary ammonium salt and the thus neutralized organic phase recycled for use for further metal extractions. Where the neutralization is effected by water washing, the wash solution will be acidic and can be used for leaching purposes. The entire process can be operated continuously as in past practices except that in the process of the invention, pH reduction on extraction is eliminated making certain extractions feasible and/or more efficient in some cases and processing flexibility is increased. The equations given above are illustrative only and it should be clearly evident that the invention has a general application to hydrogen ion exchange reagents and quaternary ammonium salts which are soluble in essentially water-immiscible organic solvents, extractable metal values, neutralizing solutions and acid stripping mediums.

A wide variety of hydrogen ion exchange reagents can be used in the present invention. These reagents are capable of being deprotonated by reaction with the quaternary ammonium salts. Representative of various of these hydrogen ion exchange reagents are α-hydroxy oximes, benzophenoximes, β-diketones, fluorinated β-diketones, benzoxazoles, 8-hydroxyquinolines, organo phosphoric acids, naphthenic acids and the like. A number of these groups of reagents are described in more detail hereinbelow.

The α-hydroxy oximes have the following general formula:

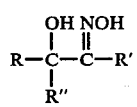

where R, R' and R" may be any of a variety of organic hydrocarbon radicals such as aliphatic and alkylaryl radicals. R" may also be hydrogen. These compounds are further described in Swanson U.S. Pat. No. 3,224,873 which description is incorporated herein by reference.

Benzophenoximes useful in the present invention may have the formula:

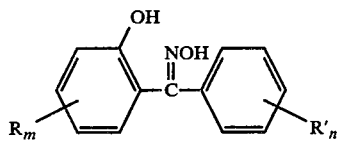

in which R and R' may be individually alike or different and are preferably saturated aliphatic groups and m and n are 0, 1, 2, 3 or 4 with the proviso that m and n are not both 0. The total number of carbon atoms in $R_m$ and $R'_n$ is from 3–25. R and R' contain 1–25 carbon atoms. These compounds are further described in Swanson United States Patent 3,592,775 which description is incorporated herein by reference. 2-Hydroxybenzophenoximes of the above type containing electron withdrawing substituents have the formula:

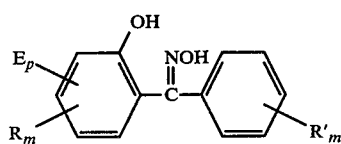

where E is an electron withdrawing substituent, p is 1, 2, 3 or 4 and m is 0 or a whole integer up to 4-p. R, R' and n are as previously described. These compounds are further described in Mattison and Swanson U.S. Pat. No. 3,655,347.

β-diketones desirably used in the present invention have the formula:

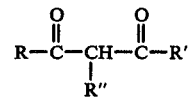

where R is phenyl or alkyl substituted phenyl, R' is alkyl, alkyl substituted phenyl or chloro substituted phenyl and R" is H or —CN with the provisos that: (1) when R is phenyl, R' is a branched chain alkyl group of at least seven carbon atoms and (2) when R is alkyl substituted phenyl, the number of carbon atoms in the alkyl substituent or substituents is at least 7 and at least one such alkyl substituent is branched chain. Compounds of this group are further described in Mackay and Rogier United States patent application Ser. No. 391,432, filed Aug. 24, 1973 and the corresponding Belgian Pat. No. 819,136 which description is incorporated herein by reference.

Fluorinated β-diketones also find use in the invention one preferred group having the formula:

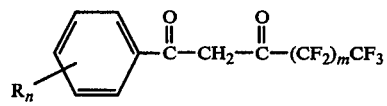

where n is a whole integer of 1 to 4, m is 0, 1 or 2 and R is an alkyl group of 1–25 carbons. Fluorinated β-diketones are variously described in U.S. Pat. Nos. 3,894,803; 2,916,349; 2,632,763; 2,830,066; etc.

Another group of hydrogen ion exchange agents useful in the invention are benzoxazoles of the formula:

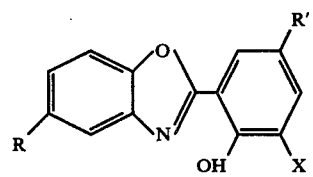

where R is hydrogen or an alkyl group having from 1 to 20 carbon atoms, R' is hydrogen, chlorine or an alkyl group containing from 1 to 20 carbon atoms, X is H or chlorine and the total number of carbon atoms in R and R' is 6 to 40 with the proviso that one of R and R' must be an alkyl group of at least 6 carbon atoms. These compounds are further described in MacKay and Rogier United States patent application Ser. No. 518,011, filed Oct. 25, 1974 which description is incorporated herein by reference.

Substituted 8-hydroxyquinolines also find use in the invention. The basic structure of these compounds is

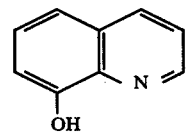

where the same will have hydrocarbon solubilizing groups such as in the 7 position where alkyl and alkenyl groups find effective use. Chloro or bromo substituted compounds (5 position) are described in Mattison U.S.

patent application Ser. No. 447,629, filed Mar. 4, 1974 which description is incorporated herein by reference.

The organo phosphoric acids may have the formula

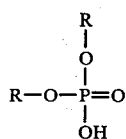

where R is an organic group, preferably hydrocarbon such as alkyl, aryl, alkylaryl and the like. These reagents are also well known in the liquid ion exchange recovery of metal values.

As indicated previously, the hydrogen ion exchange agent is neutralized with a quaternary ammonium salt. Quaternary ammonium salts are well known and a wide variety of the same may be used in the present invention. The cation portion of such quaternary ammonium compounds can be illustrated as follows:

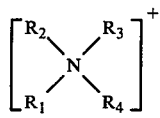

where $R_1$ is a hydrocarbon radical such as alkyl, alkenyl, aryl, alkaryl, arylalkyl and the like of 6 to 24 carbon atoms and $R_2$, $R_3$ and $R_4$ are hydrocarbon radicals of 1 to 24 carbon atoms. Representative anions $X^-$ and $X^{--}$ are chloride, bromide, iodide, sulfate, bisulfate and the like.

Representative of the above quaternary ammonium compounds are lauryltrimethyl ammonium chloride, myristyltrimethyl ammonium chloride, palmityltrimethyl ammonium chloride, lauryltrimethyl ammonium sulfate, myristyltrimethyl ammonium bromide, palmityltrimethyl ammonium iodide, stearyltrimethyl ammonium chloride, stearyltrimethyl ammonium sulfate, oleyltrimethyl ammonium chloride, oleylbutyldimethyl ammonium sulfate, dilauryldimethyl ammonium chloride, distearyldimethyl ammonium sulfate, trilaurylmethyl ammonium chloride, trioctylmethyl ammonium bromide, tridecylmethyl ammonium chloride, stearylbenzyldimethyl ammonium sulfate, oleylbenzyldiethyl ammonium chloride and the like. In the examples to follow, the quaternary ammonium salt used was a trialkyl monomethyl ammonium chloride wherein the alkyl groups contained 8 and 10 carbons, such alkyl groups being straight chained and randomly distributed in the quaternary cation.

The hydrogen ion exchange reagent, the quaternary ammonium salt, and the metal complex of the hydrogen ion exchange reagent must all be soluble in the essentially water-immiscible organic solvents to an extent of at least 2% by weight in order to practically recover metal values on a commercial scale. The organic solvents are preferably aliphatic or aromatic hydrocarbons such as the petroleum derived liquid hydrocarbons including kerosene, fuel oil, etc. In addition to the simple hydrocarbon solvents, chlorinated hydrocarbons may also be used. Accordingly, both the unsubstituted and the chlorinated solvents are contemplated by the term "liquid hydrocarbon".

An essential step in our process is the formation of the quaternary ammonium salt of the hydrogen ion exchange agents. This step is carried out by dissolving the hydrogen ion exchange agent and the starting quaternary ammonium salt in the organic solvent and then neutralizing (i.e. removing inorganic acid therefrom) by washing with water or aqueous base. The resulting neutralized solutions form part of the present invention and comprise at least about 2 percent of the so-formed quaternary ammonium salt of the hydrogen ion exchange agent in the organic solvent. In use, the said salt will preferably be present in an amount of about 2 to 15% by weight in the solvent. However, the said salt solution may be sold as a concentrate for later dilution prior to using same in the metal recovery process. In such instance, the salt will generally be present in the solvent in amounts of 15% or more, preferably 25-75% by weight. Also, in continuous extraction processes, the quaternary ammonium salt of the hydrogen ion exchange reagent will be continuously regenerated as a separate step in the overall process subsequent to stripping of the metal loaded phase and prior to use for further extraction. The hydrogen ion exchange reagent and the starting quaternary ammonium salt will preferably be used in essentially equimolar amounts in the formation of the new hydrogen ion exchange reagent salt solutions.

As indicated, the neutralization is carried out by water washing or with aqueous solutions of bases. The latter are preferred with representative bases being sodium bicarbonate, sodium hydroxide, sodium carbonate, potassium hydroxide, calcium hydroxide, potassium carbonate, ammonia or ammonium hydroxide and the like. Preferably also only relatively dilute solutions of base need be used.

In its general aspects, the metal recovery process of the present invention comprises contacting an aqueous metal value containing solution with an organic solvent solution of the quaternary ammonium salt of the hydrogen ion exchange reagent to extract at least a portion of the metal values into the organic phase, separating the metal pregnant organic phase from the aqueous phase and stripping at least a portion of the metal values from the organic phase by contacting same with an aqueous acidic stripping solution. In most, if not all, commercial operations, the organic phase must be regenerated for economic purposes. As such, the process of the invention will then comprise the steps of neutralizing the stripped organic phase and recycling the organic phase for contacting further quantities of the metal containing aqueous solution. The phase ratios in these steps can be varied widely as it will be apparent that the contacting, for example, of any quantity of the organic phase with the aqueous metal containing phase will result in extraction of metal into the organic phase. However, for commercial practicality, the various organic:aqueous phase ratios are preferably in the range of 10:1 to 1:10. Also for practical purposes, the extractions (and stripping and neutralization) are normally carried out at ambient temperatures and pressures.

The loaded organic is stripped using aqueous acidic stripping mediums such as aqueous sulfuric acid, hydrochloric acid and the like. The starting metal containing solution has a pH of less than 7.0 and, as indicated, the optimum pH will vary depending especially upon the metal being extracted and the particular extractant therefor. A wide variety of metal values may be extracted according to our process including, without being limited thereto, copper, nickel, cobalt, zinc, magnesium, cadmium, iron, mercury, lithium, silver(I), and the like. Divalent metal recovery is especially facilitated by the invention.

The following Examples illustrate preferred embodiments of the invention without being limiting:

EXAMPLE I-A

Equal volumes of a solution of both the quaternary ammonium chloride (0.1M) and 1-dodecylphenyl-3-trifluoromethyl-1,3-propanedione (0.1M) in an aromatic petroleum solvent (Aromatic 150 available from Exxon) and aqueous $NaHCO_3$ (5% by weight) were shaken together for two minutes. The aqueous phase was drawn off and the organic contacted a second time with an equal volume of the $NaHCO_3$ solution. The organic was then washed with water to a pH of 7–8 and filtered through filter paper to remove trace amounts of water. In the diketone reagent, the dodecyl group is in the para position and was derived from a synthetic alkylbenzene, Chevron alkylate 21, in which the alkyl chain is branched and contains an average of 12 carbon atoms.

The quaternary ammonium salt of the diketone as above prepared was contacted at various organic:aqueous phase ratios with an aqueous solution containing 5.10 g./l. $Cu^{++}$ (as $CuSO_4$) and having an initial pH of 2.0 (the solutions were combined in a bottle and shaken for 30 minutes). The organic and aqueous phases were analyzed for $Cu^{++}$ content and the pH of the separated aqueous was measured. Results are set forth in the following Table I-A:

Table I-A

| Org. ml. | Aq. ml. | O/A Phase Ratio | pH initial | pH final | $Cu^{++}$ (org.) g./l. | $Cu^{++}$ (aq.) g./l. |
|---|---|---|---|---|---|---|
| 10 | 40 | 1/4 | 2.0 | 2.33 | 2.14 | 4.5 |
| 10 | 20 | 1/2 | 2.0 | 2.40 | 2.34 | 3.93 |
| 10 | 10 | 1/1 | 2.0 | 2.67 | 2.50 | 2.60 |
| 20 | 10 | 2/1 | 2.0 | 3.09 | 2.33 | 0.44 |
| 30 | 10 | 3/1 | 2.0 | 3.70 | 1.67 | 0.03 |
| 50 | 10 | 5/1 | 2.0 | 4.20 | 1.03 | 0.00 |
| 100 | 10 | 10/1 | 2.0 | 4.62 | 0.50 | 0.00 |

For comparison purposes, the first six runs as set forth above were repeated except that the diketone alone was used at a concentration of 0.1M in the aromatic solvent (the quaternary ammonium chloride was not used and the solution was not contacted with the $NaHCO_3$ solution). Results are set forth in the following Table I-A Comparative:

Table I-A Comparative

| Org. ml. | Aq. ml. | O/A Phase Ratio | pH initial | pH final | $Cu^{++}$ (org.) g./l. | $Cu^{++}$ (aq.) g./l. |
|---|---|---|---|---|---|---|
| 10 | 40 | 1/4 | 2.0 | 1.90 | 1.31 | 4.77 |
| 10 | 20 | 1/2 | 2.0 | 1.82 | 1.11 | 4.60 |
| 10 | 10 | 1/1 | 2.0 | 1.70 | 0.88 | 4.21 |
| 20 | 10 | 2/1 | 2.0 | 1.60 | 0.64 | 3.74 |
| 35 | 10 | 3/1 | 2.0 | 1.55 | 0.51 | 3.47 |
| 50 | 10 | 5/1 | 2.0 | 1.50 | 0.31 | 3.07 |

EXAMPLE I-B

The diketone salt as prepared in Example I-A was used to extract nickel by contacting (with shaking for 30 minutes) ten milliliter portions thereof with five milliliter portions of a 1.0M solution of aqueous $NiSO_4$ plus various amounts of water and/or pH adjusting solutions. Results of these extractions are set forth in the following Table I-B-

Table I-B

| Org. ml. | $NiSO_4$ Solution ml. | $H_2O$ ml. | pH Adjusting Solution ml. | pH Final | $Ni^{++}$ (org.) g./l. |
|---|---|---|---|---|---|
| 10 | 5 | 5 | — | 4.15 | 2.14 |
| 10 | 5 | — | 5 (6 g./l. $H_2SO_4$) | 2.58 | 1.38 |
| 10 | 5 | 4 | 1 (0.1M $NaHCO_3$) | 6.82 | 2.12 |
| 10 | 5 | 2 | 3 (25 g./l. $H_2SO_4$) | 2.10 | 0.45 |
| 10 | 5 | 2 | 3 (6 g./l. $H_2SO_4$) | 2.98 | 1.79 |
| 10 | 5 | 3 | 2 (6 g./l. $H_2SO_4$) | 2.85 | 1.67 |

EXAMPLES II–XI

Salts of various hydrogen ion exchange reagents and the quaternary ammonium chloride were prepared in Aromatic 150 as in Example I-A and used to extract divalent copper, nickel, cobalt and zinc. Equal volumes of said solutions of salts were used with various aqueous solutions of the metal values (1.0M of the respective aqueous metal sulfate solutions diluted with an equal volume of water and/or pH adjusting solutions as in Example I-B). The hydrogen ion exchange agents used were as follows:

| Example | Agent |
|---|---|
| II | 5,8-diethyl-7-hydroxydodecane-6-oxime |
| III | 2-hydroxy-5-nonylbenzophenoxime (the nonyl group was branched chain) |
| IV | 6-n-butyl-6-hydroxydodecane-5-oxime |
| V | 2-hydroxy-3-chloro-5-nonylbenzophenoxime (the nonyl group was branched chain) |
| VI | diketone as used in Example I-A |
| VII | 1-(4-dodecylphenyl)-3-heptyl-1,3-propanedione (the dodecyl and heptyl groups were branched chain) |
| VIII | 2-(2-hydroxy-3,5-dichlorophenyl)-5-dodecylbenzoxazole (the dodecyl group was branched chain) |
| IX | 7-dodecenyl-8-hydroxyquinoline |
| X | di-2-ethylhexylphosphoric acid |
| XI | naphthenic acid |

Results of these extractions are set forth in the following Tables, such table numbers corresponding to the hydrogen ion exchange reagent numbers above:

Table II

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 2.50 | 1.92 | 4.95 | 0.40 | 5.70 | 0.32 | 5.65 | 0.27 |
| 2.05 | 1.15 | 4.08 | 0.28 | 3.75 | 0.21 | 4.80 | 0.29 |
| 1.69 | 0.80 | 2.90 | 0.23 | 3.40 | 0.21 | 3.40 | 0.28 |
| 1.20 | 0.48 | 2.50 | 0.17 | 2.92 | 0.19 | 2.19 | 0.14 |
| 0.60 | 0.19 | 2.00 | 0.09 | 2.17 | 0.10 | 1.70 | 0.05 |
|  |  | 1.20 | 0.03 | 1.20 | 0.02 | 1.20 | 0.02 |

Table III

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 2.98 | 3.12 | 5.90 | 2.10 | 6.02 | 1.65 | 6.00 | 0.11 |
| 2.40 | 2.13 | 5.15 | 1.19 | 5.78 | 0.80 | 5.00 | 0.13 |
| 2.00 | 1.39 | 4.85 | 0.73 | 5.70 | 0.42 | 2.50 | 0.07 |
| 1.72 | 1.04 | 4.65 | 0.43 | 5.60 | 0.19 | 1.90 | 0.03 |
| 1.40 | 0.60 | 3.40 | 0.11 | 3.20 | 0.12 | 1.40 | 0.01 |
| 1.18 | 0.12 | 2.40 | 0.06 | 2.40 | 0.07 | 2.15 | 0.04 |
| 0.07 | 0.04 | 1.85 | 0.02 | 1.85 | 0.03 |  |  |

Table IV

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 2.50 | 2.30 | 5.70 | 0.64 | 6.40 | 0.47 | 5.60 | 0.48 |
| 2.50 | 2.02 | 5.10 | 0.41 | 5.95 | 0.36 | 4.10 | 0.35 |
| 2.10 | 1.25 | 3.32 | 0.33 | 5.70 | 0.33 | 3.25 | 0.33 |

Table IV-continued

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 1.24 | 0.56 | 2.85 | 0.30 | 3.20 | 0.25 | 2.15 | 0.16 |
| 0.58 | 0.21 | 2.50 | 0.24 | 2.90 | 0.25 | 1.19 | 0.02 |
|  |  | 1.75 | 0.09 | 2.15 | 0.12 |  |  |
|  |  | 1.20 | 0.02 | 1.20 | 0.02 |  |  |

Table V

| pH Final | [Cu] Org. g./l. | pH Final | [Ni] Org. g./l. | pH Final | [Co] Org. g./l. | ph Final | [Zn] Org. g./l. |
|---|---|---|---|---|---|---|---|
| 4.25 | 3.08 | 5.40 | 2.76 | 5.32 | 1.90 | 5.75 | 0.81 |
| 2.20 | 3.69 | 4.49 | 1.83 | 5.13 | 0.74 | 4.70 | 0.20 |
| 1.25 | 1.92 | 4.08 | 0.65 | 4.72 | 0.42 | 2.52 | 0.10 |
| 0.63 | 1.13 | 3.95 | 1.15 | 3.10 | 0.09 | 1.90 | 0.02 |
| 0.38 | 0.78 | 2.55 | 0.09 | 1.40 | 0.01 | 1.40 | 0.01 |
| 0.10 | 0.46 | 1.89 | 0.024 |  |  |  |  |

Table VI

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 4.10 | 3.51 | 6.82 | 2.12 | 6.80 | 1.91 | 5.80 | 2.42 |
| 2.47 | 3.04 | 6.64 | 2.14 | 6.55 | 1.92 | 4.53 | 2.45 |
| 1.92 | 2.19 | 4.15 | 2.14 | 5.68 | 1.86 | 2.90 | 1.39 |
| 1.52 | 1.27 | 2.98 | 1.79 | 4.33 | 1.86 | 1.98 | 0.18 |
| 1.00 | 0.36 | 2.85 | 1.67 | 2.50 | 0.87 | 1.70 | 0.10 |
|  |  | 2.58 | 1.38 | 2.00 | 0.23 |  |  |
|  |  | 2.10 | 0.45 |  |  |  |  |

Table VII

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 3.40 | 2.68 | 6.72 | 1.48 | 7.10 | 1.34 | 5.70 | 0.79 |
| 3.00 | 1.84 | 5.90 | 0.51 | 6.70 | 1.01 | 4.80 | 0.63 |
| 1.35 | 0.11 | 4.52 | 0.52 | 6.30 | 0.53 | 2.48 | 0.46 |
|  |  | 2.55 | 0.45 | 4.80 | 0.50 | 1.33 | .13 |
|  |  | 2.12 | 0.27 | 3.10 | 0.49 |  |  |
|  |  | 1.25 | 0.05 | 2.16 | 0.23 |  |  |
|  |  |  |  | 1.32 | 0.05 |  |  |

Table VIII

| pH Final | [Cu] Org. g./l. | pH Final | [Ni] Org. g./l. | pH Final | [Co] Org. g./l. |
|---|---|---|---|---|---|
| 3.55 | 3.57 | 5.00 | 2.17 | 5.00 | 1.91 |
| 2.45 | 3.22 | 3.82 | 1.65 | 4.10 | 1.48 |
| 2.15 | 2.91 | 3.45 | 1.17 | 3.70 | 1.05 |
| 1.29 | 1.17 | 2.70 | 0.45 | 2.72 | 0.42 |
| 0.60 | 0.15 | 1.70 | 0.12 | 1.60 | 0.10 |

Table IX

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 2.20 | 3.10 | 3.97 | 1.45 | 4.17 | 1.09 | 4.52 | 1.77 |
| 1.90 | 2.95 | 3.82 | 1.35 | 4.12 | 0.95 | 4.32 | 1.27 |
| 1.58 | 2.78 | 3.72 | 1.13 | 4.05 | 1.01 | 3.20 | 0.65 |
| 0.60 | 2.33 | 2.60 | 0.36 | 3.10 | 0.53 | 2.32 | 0.37 |
| 0.30 | 1.96 | 1.52 | 0.04 | 2.62 | 0.32 | 1.55 | 0.14 |
| 0.02 | 1.46 | 0.85 | 0.02 | 1.55 | 0.07 | 0.60 | 0.04 |

Table X

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 4.00 | 0.33 | 5.60 | 0.20 | 5.00 | 0.22 | 3.80 | 0.91 |
| 2.53 | 0.08 | 5.40 | 0.09 | 4.60 | 0.11 | 2.50 | 0.11 |
| 1.70 | 0.02 | 4.50 | 0.03 | 3.10 | 0.03 | 2.00 | 0.04 |
| 1.35 | 0.01 | 3.70 | 0.01 | 2.50 | 0.02 | 1.68 | 0.03 |
|  |  | 3.50 | 0.01 | 1.98 | 0.02 | 0.95 | 0.01 |

Table XI

| pH Final | [Cu] Org. g./l. | pH Final | [Ni] Org. g./l. | pH Final | [Co] Org. g./l. | pH Final | [Zn] Org. g./l. |
|---|---|---|---|---|---|---|---|
| 3.70 | 0.44 | 6.80 | 0.36 | 5.60 | 0.17 | 4.99 | 0.49 |
| 3.00 | 0.38 | 5.45 | 0.21 | 3.75 | 0.22 | 3.82 | 0.26 |
| 2.52 | 0.34 | 3.80 | 0.28 | 1.90 | 0.05 | 3.45 | 0.23 |
| 1.40 | 0.04 | 1.90 | 0.08 | 1.40 | 0.02 | 2.60 | 0.21 |
|  |  | 1.40 | 0.02 |  |  | 1.45 | 0.03 |

EXAMPLES XII-XV

Loaded organic solutions prepared as in Examples I–XI were stripped of metal values with aqueous sulfuric acid (1.50 g./l. $H_2SO_4$). Equal volumes of the loaded organics and the stripping solution were contacted with shaking for two minutes. After separation of the phases, the stripped organic was analyzed for metal value content. In the present Examples, the loaded organics are identified by reference to the hydrogen ion exchange reagent salts of Examples II–XI used in extracting the metal values. Results of the stripping operations are set forth in the following Tables XII–XV:

Table XII

| Reagent Salt Exp. | Loaded Organic $Cu^{++}$ g./l. | Stripped Organic $Cu^{++}$ g./l. | % $Cu^{++}$ Stripped |
|---|---|---|---|
| II | 3.77 | 0.08 | 98 |
| III | 2.13 | 0.004 | 99.5 |
| IV | 2.43 | 0.004 | 99.5 |
| V | 3.08 | 0.071 | 97.8 |
| VI | 3.04 | 0.002 | 99.7 |
| VIII | 3.57 | 0.002 | 100 |
| IX | 3.10 | 0.228 | 92.5 |
| X | 0.334 | 0.0001 | 100 |
| XI | 0.339 | <0.0001 | 100 |

Table XIII

| Reagent Salt Exp. | Loaded Organic $Ni^{++}$ g./l. | Stripped Organic $Ni^{++}$ g./l. | % $Ni^{++}$ Stripped |
|---|---|---|---|
| II | 1.41 | 0.34 | 76 |
| III | 2.16 | 0.0005 | 100 |
| IV | 0.504 | 0.0016 | 100 |
| V | 1.83 | 0.03 | 98.3 |
| VI | 2.14 | 0.0006 | 100 |
| VII | 1.48 | 0.0012 | 100 |
| VIII | 2.17 | 0.0032 | 100 |
| IX | 1.14 | 0.0008 | 100 |
| X | 0.204 | <0.0005 | 100 |
| XI | 0.36 | <0.0005 | 100 |

Table XIV

| Reagent Salt Exp. | Loaded Organic $Co^{++}$ g./l. | Stripped Organic $Co^{++}$ g./l. | % $Co^{++}$ Stripped |
|---|---|---|---|
| II | 0.322 | 0.081 | 74.4 |
| III | 1.73 | 1.12 | 34.6 |
| IV | 0.327 | 0.045 | 83 |
| V | 1.90 | 1.31 | 31.4 |
| VI | 1.86 | <0.0005 | 100 |
| VII | 1.01 | 0.248 | 75 |
| VIII | 1.05 | 0.0018 | 100 |
| IX | 0.93 | 0.705 | 24.6 |
| X | 0.214 | 0.0001 | 100 |
| XI | 0.225 | <0.0005 | 100 |

Table XV

| Reagent Salt Exp. | Loaded Organic $Zn^{++}$ g./l. | Stripped Organic $Zn^{++}$ g./l. | % $Zn^{++}$ Stripped |
|---|---|---|---|
| II | 0.157 | <0.0001 | 100 |
| III | 0.101 | 0.003 | 100 |
| IV | 0.345 | 0.0005 | 100 |
| V | 0.760 | 0.007 | 99 |

Table XV-continued

| Reagent Salt Exp. | Loaded Organic $Zn^{++}$ g./l. | Stripped Organic $Zn^{++}$ g./l. | % $Zn^{++}$ Stripped |
|---|---|---|---|
| VI | 2.42 | 0.0007 | 100 |
| VII | 0.790 | <0.0005 | 100 |
| IX | 1.77 | 0.0007 | 100 |
| X | 0.014 | <0.0005 | 100 |
| XI | 0.486 | <0.0005 | 100 |

EXAMPLE XVI

Example I-A was essentially repeated except kerosene was used as the solvent, the diketone and quaternary ammonium compound were used at levels of 10 and 11.2% weight/volume, respectively, and the resulting solution of the diketone salt was used to extract nickel (4 g./l. $Ni^{++}$ as $NiSO_4$, pH 4.2) and cobalt (4 g./l. $Co^{++}$ as $CoSO_4$, pH 3.9). Analyses indicated that 4.1 g./l. $Ni^{++}$ and 2.6 g./l. $Co^{++}$ were extracted with raffinate (metal barren aqueous) pH values of 6.8 and 7.2, respectively.

The embodiments of the invention in which an exclusive property or privilege is claimed are defined as follows:

1. A composition consisting essentially of an essentially water-immiscible organic solvent containing dissolved therein at least about 2% by weight of a quaternary ammonium salt of a hydrogen ion exchange agent wherein the salt has the formula QL where Q is the quaternary ammonium cation of the formula

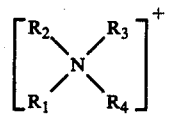

where $R_1$ is a hydrocarbon radical of 6 to 24 carbon atoms and $R_2$, $R_3$ and $R_4$ are hydrocarbon radicals of 1 to 24 carbon atoms and L is the deprotonated moiety of anion of the hydrogen ion exchange reagent, L being derived from reagents selected from the group consisting of (a) an α-hydroxy oxime
(b) a 2-hydroxybenzophenoxime
(c) a β diketone
(d) a hydroxy containing benzoxazole and
(e) a substituted 8-hydroxyquinoline.

2. The composition of claim 1 wherein the salt is present in the solvent in an amount of about 2 to 75% by weight.

3. The composition of claim 2 wherein the solvent is a liquid hydrocarbon.

4. The composition of claim 1 wherein said β-diketone is a fluorinated beta-diketone.

* * * * *